(12) United States Patent
Kim

(10) Patent No.: US 9,154,680 B2
(45) Date of Patent: Oct. 6, 2015

(54) CAMERA MODULE FOR AN OPTICAL TOUCH SCREEN

(76) Inventor: Sung-Han Kim, Seoul (KR)

(*) Notice: Subject to any disclaimer, the term of this patent is extended or adjusted under 35 U.S.C. 154(b) by 235 days.

(21) Appl. No.: 13/520,840

(22) PCT Filed: Jan. 5, 2011

(86) PCT No.: PCT/KR2011/000039
§ 371 (c)(1),
(2), (4) Date: Jul. 6, 2012

(87) PCT Pub. No.: WO2011/083956
PCT Pub. Date: Jul. 14, 2011

(65) Prior Publication Data
US 2013/0002611 A1    Jan. 3, 2013

(30) Foreign Application Priority Data

Jan. 8, 2010  (KR) ................... 20-2010-0000141 U
Jan. 4, 2011  (KR) ..................... 10-2011-0000510

(51) Int. Cl.
*G06F 3/042*    (2006.01)
*H04N 5/225*    (2006.01)

(52) U.S. Cl.
CPC ............ *H04N 5/2257* (2013.01); *G06F 3/0425* (2013.01); *G06F 3/0426* (2013.01); *H04N 5/2251* (2013.01)

(58) Field of Classification Search
CPC ... G06F 3/0425; G06F 3/0426; G06F 3/0428; G06F 3/0421; H04N 5/2257; H04N 5/2251
USPC ...................... 345/173–178; 178/18.01–18.11
See application file for complete search history.

(56) References Cited

U.S. PATENT DOCUMENTS

| | | | | |
|---|---|---|---|---|
| 4,047,187 A | * | 9/1977 | Mashimo et al. | 396/100 |
| 4,914,461 A | * | 4/1990 | Hori | 396/62 |
| 6,100,538 A | * | 8/2000 | Ogawa | 250/559.29 |
| 6,441,362 B1 | | 8/2002 | Ogawa | |
| 6,614,478 B1 | * | 9/2003 | Mead | 348/337 |

(Continued)

FOREIGN PATENT DOCUMENTS

| | | |
|---|---|---|
| CN | 1697300 A | 11/2005 |
| JP | 11-003170 A | 1/1999 |

(Continued)

OTHER PUBLICATIONS

International Search Report dated Sep. 8, 2011, issued in International Application No. PCT/KR2011/000039 (2pp, in English-language).

*Primary Examiner* — Amare Mengistu
*Assistant Examiner* — Stacy Khoo
(74) *Attorney, Agent, or Firm* — NSIP Law

(57) ABSTRACT

The present invention relates to a camera module which senses the position of an on object touching a touch surface of an optical touch screen. The camera module comprises one or more lenses, an optical path converting unit, and an image sensor. Each of the lenses is arranged such that the angle of view for the direction vertical to the touch surface is smaller than the angle of view in the direction horizontal to the touch surface. The optical path converting unit reflects light converging through the lenses in the direction vertical to the touch screen. The image sensor is arranged behind the lenses and in the direction horizontal to the touch surface so as to receive the light reflected by the optical path converting unit.

5 Claims, 9 Drawing Sheets

(56) References Cited

U.S. PATENT DOCUMENTS

| | | |
|---|---|---|
| 6,664,952 B2 | 12/2003 | Iwamoto et al. |
| 7,129,620 B2 | 10/2006 | Sakano et al. |
| 8,035,625 B2 | 10/2011 | Lee |
| 2007/0146318 A1* | 6/2007 | Juh et al. ................. 345/157 |
| 2008/0088942 A1* | 4/2008 | Seo ........................ 359/672 |
| 2010/0026645 A1* | 2/2010 | Yim et al. ................ 345/173 |

FOREIGN PATENT DOCUMENTS

| | | |
|---|---|---|
| JP | 2000-155650 A | 6/2000 |
| JP | 2008-242996 A | 10/2008 |
| JP | 2009-181512 A | 8/2009 |
| KR | 10-2008-0044017 A | 5/2008 |
| KR | 10-0919437 B1 | 9/2009 |

* cited by examiner

CAMERA MODULE FOR AN OPTICAL TOUCH SCREEN

CROSS-REFERENCE TO RELATED APPLICATIONS

This application is a National Stage of International Application No. PCT/KR2011/000039, filed Jan. 5, 2011 and published as WO2011/083956 on Jul. 14, 2011, which claims the benefit of Korean Patent Application Nos. 20-2010-000141, filed on Jan. 8, 2010, and 10-2011-0000510, filed on Jan. 4, 2011, the entire disclosures of which are incorporated herein by reference for all purposes.

TECHNICAL FIELD

The following description relates to a camera module for an optical touch screen capable of detecting a coordinate at which a touch has occurred when a screen was touched by a finger, a touch pen, etc.

BACKGROUND ART

With the development of various displays such as a Liquid Crystal Display (LCD), a touch screen is widely used as one of the most efficient input devices for an interface between a user and a display. Since the touch screen allows a user to visually and conveniently manipulate various devices, such as a computer, a mobile phone, a banking terminal, a game console, etc., using a user's finger or a touch pen, etc., the touch screen can be applied to various applications.

Generally, methods for implementing a touch screen include an electrical method and an optical method. The electrical method may provide a resistive film type touch screen or an electrostatic capacitive type touch screen. The resistive film type and electrostatic capacitive type touch screens are generally applied to small-sized touch screens since they require a high manufacturing cost and have technical limitations for manufacturing large-size touch screens.

The optical method may use an infrared matrix type, a camera-based type, or the like. The infrared matrix touch screen has been fabricated as a middle- or large-sized touch screen. However, as the screen size of a touch screen increases, the touch screen consumes more power, requires a higher manufacturing cost, and is exposed to a higher risk of wrong operations due to surrounding conditions, such as sunlight, lighting, etc.

The camera-based touch screen is mainly fabricated as a large-sized touch screen. The camera-based touch screen may calculate location coordinates of a touching object on the basis of angles of images of the touching object captured by two cameras. The camera-based touch screen is also, like the infrared matrix touch screen, exposed to a high risk of wrong operation due to surrounding conditions, such as sunlight, lighting, etc., and may make an error in detecting the exact coordinate of touch point when a large object approaches the touch screen.

Especially, since a conventional touch sensing camera uses a circular lens, the larger aperture of the circular lens, the higher height of the camera disposed vertical to the touch surface. Furthermore, an image sensor is arranged in a standing position behind the camera lens in the direction of optical axis, this adds a further limitation in lowering the height of the camera disposed vertical to the touch surface. Accordingly, there are difficulties in installing cameras having the above-described configuration in a small- or middle-sized display, such as a LCD monitor for a desktop, a LCD monitor for a notebook, etc.

Technical Problem

The following description relates to a camera module for an optical touch screen, capable of accurately detecting a position at which a touch has occurred and minimizing a height in the direction vertical to a touch surface, so that the camera module can be easily installed in a small- or middle-sized display.

Technical Solution

In one general aspect, there is provided a camera module for an optical touch screen, which senses a position of an object touching a touch surface of the optical touch screen, the camera module including: at least one lens configured such that an angle of view for a direction vertical to the touch surface is smaller than an angle of view for a direction horizontal to the touch surface; an optical path converting unit configured to reflect light collected through the lens in the direction vertical to the touch surface; and an image sensor arranged behind the lens in the direction horizontal to the touch surface, and configured to receive the light reflected by the optical path converting unit.

Additional features of the invention will be set forth in the description which follows, and in part will be apparent from the description, or may be learned by practice of the invention.

Advantageous Effects

According to the exemplary embodiments of the present invention, in a camera module, since the angle of view for the direction vertical to the touch surface is smaller than the angle of view in the direction horizontal to a touch surface such that at the angle of view for the direction vertical to the touch screen, an area only adjacent to the touch surface can be sensed, it is possible to block external light incoming at the greater vertical angle of view and consequently avoid wrong operation due to such external light. Also, it is possible to prevent wrong sensing about a touch position, such as sensing the upper portion of an object approaching or touching the touch surface.

Also, since the camera module provides a very thin lens in the direction vertical to the touch surface although using lenses having a large aperture, and the image sensor is arranged in the direction horizontal to the touch surface, it is possible to minimize the height of the camera module in the direction vertical to the touch surface. Accordingly, an optical touch screen with the camera module can have a thin thickness and be easily installed in a small- or middle-sized display, such as a LCD monitor for a desktop, a LCD monitor for a notebook, etc.

DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

MODE FOR INVENTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 1:
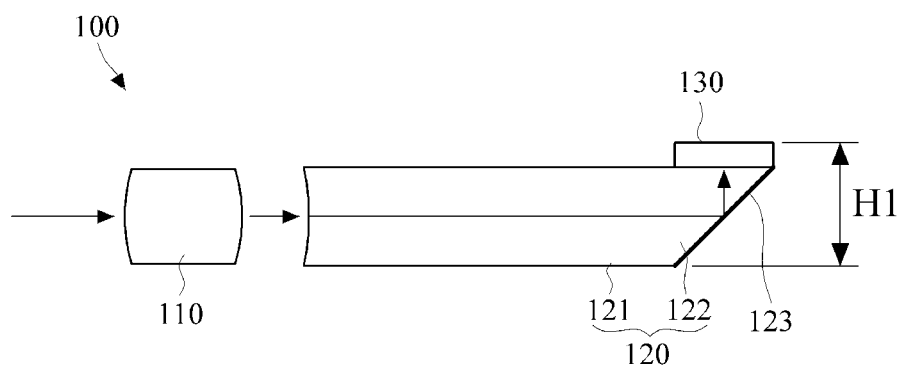
FIG. 1 shows an example of a camera module for an optical touch screen.
Figure 2:
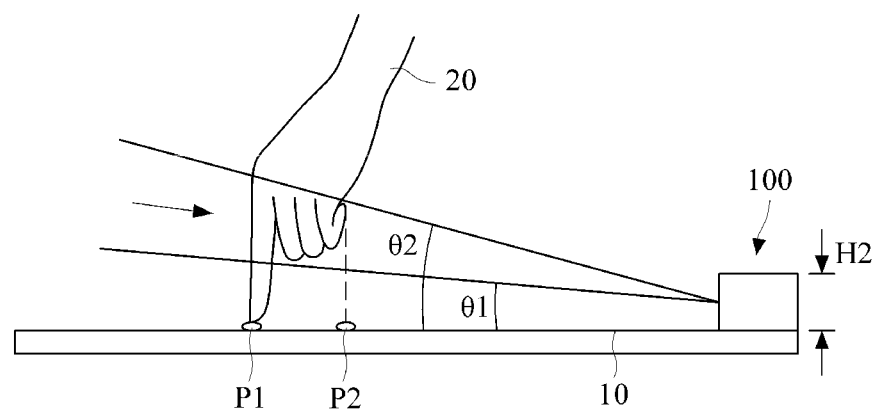
FIG. 2 is a view for explaining a characteristic of the camera module shown in FIG. 1.
Figure 3:
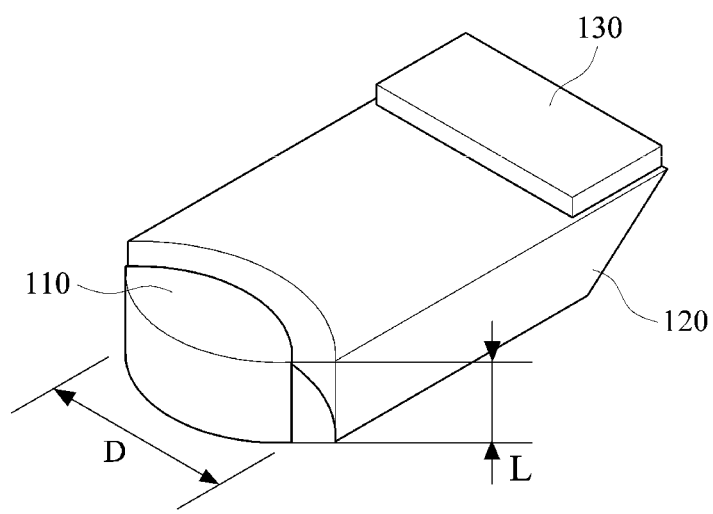
FIG. 3 is a perspective view of the camera module shown in FIG. 1.
Figure 4:
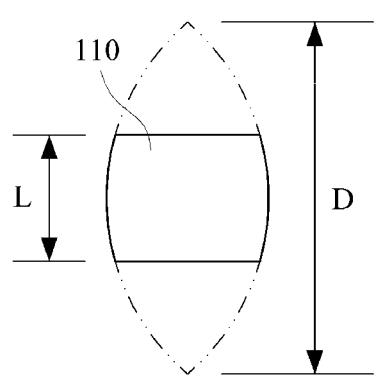
FIG. 4 is a view for explaining the shape of a lens shown in FIG. 3.

FIG. 1 shows an example of a camera module 100 for an optical touch screen, FIG. 2 is a view for explaining a characteristic of the camera module shown in FIG. 1, FIG. 3 is a perspective view of the camera module shown in FIG. 1, and FIG. 4 is a view for explaining the shape of a lens 110 shown in FIG. 3.

Referring to FIGS. 1 through 4, the camera module 100 for the optical touch screen is installed in an optical touch screen, and configured to sense the position of an object 20, such as a finger or a touch pen, touching a touch surface 10 of the optical touch screen. The camera module 100 includes a lens 110, an optical path converting unit 120, and an image sensor 130.

The lens 110 collects an optical image of a subject, that is, the object 20. The lens 110 is configured such that the angle of view for the direction vertical to the touch surface 10 is smaller than the angle of view for the direction horizontal to the touch surface 10. The optical path converting unit 120 reflects light collected through the lens 110 in the direction vertical to the touch surface 10. That is, the optical path converting unit 120 transfers light passed through the lens 110 in the direction vertical to the image sensor 130 arranged in the direction horizontal to the touch surface 10.

The image sensor 130 is used to receive the optical image of the object 20 created by the lens 110 and convert the optical image into an electrical signal. The image sensor 130 is arranged behind the lens 110 in the direction horizontal to the touch surface 10 so as to receive light reflected by the optical path converting unit 120. The image sensor 130 may be a Charge-Coupled Device (CCD) image sensor or a Complementary Metal-Oxide Semiconductor (CMOS) image sensor.

As illustrated in FIG. 2, the camera module 100 may have a small angle $\theta 1$ of view for the direction vertical to the touch surface 10 of the optical touch screen so as to sense only an area adjacent to the touch surface 10. If the angle of view for the direction vertical to a touch surface is unnecessarily great as denoted as $\theta 2$ in FIG. 2, like a conventional technique, sensing the position of a touch is greatly influenced by external light, such as sunlight, external illumination, etc. In addition, in the case of a conventional camera module where the angle of view for the direction vertical to a touch surface is unnecessarily great as denoted as $\theta 2$ in FIG. 2, when an object 20 such as a hand touches a touch surface 10, the conventional camera module may sense a position P2 corresponding to the upper portion of the object 20, as a touch position, not sensing a position P1 corresponding to the bottom portion of the object 20.

In the camera module 100 according to the current example, since the lens 110 is configured such that the angle of view for the direction vertical to the touch surface 10 is smaller than the angle of view for the direction horizontal to the touch surface 10, it is possible to narrow a light-receiving range in the direction vertical to the touch surface 10. For example, if the angle of view is reduced from $\theta 2$ to $\theta 1$, the lens 110 receives incident light incoming only at an angle smaller than $\theta 1$. As a result, it is possible to optically block external light and prevent wrong sensing about a touch position.

Also, since the image sensor 130 is arranged in the direction horizontal to the touch surface 10, the height H1 of an optical system including the image sensor 130 and the optical path converting unit 120 is prevented from increasing in the direction vertical to the touch surface 10, even if the area of the image sensor 130 increases. Accordingly, the total height H2 of the camera module 100 in the direction vertical to the touch surface 10 can be minimized, which leads to a thin thickness of the optical touch screen.

Meanwhile, the lens 110 may have, as illustrated in FIG. 4, a shape in which the opposite peripheral portions of a circular lens are cut off in the direction horizontal to the touch surface 10. Due to the shape of the lens 110, the lens 110 may be configured such that the angle of view for the direction vertical to the touch surface 10 is smaller than the angle of view for the direction horizontal to the touch surface 10. Also, since the height L of the lens 110 in the direction vertical to the touch surface 10 is smaller than the aperture D of the lens 110 in the direction horizontal to the touch surface 10. The height L of the lens in the direction vertical to the touch surface 10 can be minimized even if the aperture D of the lens D is increased. Accordingly, the total height H2 of the camera module 100 in the direction vertical to the touch surface 10 may be minimized, thereby reducing the thickness of the optical touch screen.

The lens 110 may be a single piece of lens or include two or more pieces of lenses to enhance the performance of the lens 110. For example, the lens 110 may be a lens system into which a plurality of lenses are combined including aspherics. In this case, each of the lenses also may have a shape in which the opposite peripheral portions of a circular lens are cut off in the direction horizontal to a touch surface.

The optical path converting unit 120 may include a lens section 121 and a prism section 122. The lens section 121 focuses light collected through the lens 110 on the image sensor 130. The lens section 121 may have an incident surface that is wider than an exit surface of the lens 110, as shown in FIGS. 1 and 3, so as to receive all light passed through the lens 110.

The prism section 122 has a total reflection surface 123 for reflecting the light focused through the lens section 121 to the image sensor 130. The total reflection surface 123 of the prism section 122 is a cut-off surface that meets the touch surface 10 at 45 degrees. The light passed through the lens section 121 enters the prism section 122, is reflected by the total reflection surface 123, and then emitted to the image sensor 130. The optical path converting unit 120 may have a structure where the lens section 121 is integrated with the prism section 122.

The image sensor 130 may be attached to a surface of the prism section 122, to which the light reflected by the prism section 122 is emitted. Accordingly, the height H1 from the lower surface of the prism section 122 to the upper surface of the image sensor 130 may be minimized. The image sensor 130 may be, unlike the example of FIG. 1, attached to the lower surface of the prism section 122. In this case, the prism section 122 is positioned upside down.

Figure 5:
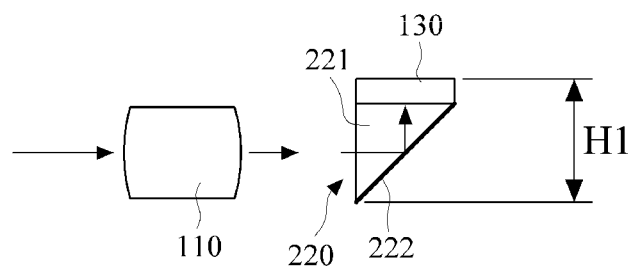
FIG. 5 shows another example of the optical path converting unit shown in FIG. 1.

FIG. 5 shows another example of the optical path converting unit 220. As shown in FIG. 5, the optical path converting unit 220 may include a prism 221 having a total reflection surface 222 for reflecting light collected through the lens 110 to the image sensor 130. The prism 221 has its surface toward the lens 110 as an incident surface, and its surface toward the image sensor 130 as an exit surface. Also, the total reflection surface 222 is formed on a cut-off surface of the prism 221 that meets the touch surface 10 at 45 degrees.

The light passed through the lens 110 enters the prism 221, is reflected by the total reflection surface 222, and then emitted to the image sensor 130 through the exit surface. Here, the image sensor 130 may be attached on a surface (that is, an exit surface) of the prism 221, to which the light reflected by the prism 221 is emitted. Accordingly, the height H1 from the lower surface of the prism 221 to the upper surface of the image sensor 130 may be minimized.

Figure 6:
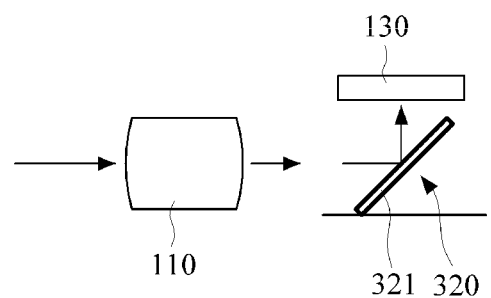
FIG. 6 shows another example of the optical path converting unit shown in FIG. 1.

As another example, the optical path converting unit 320 may include, as shown in FIG. 6, a reflection mirror 321 for reflecting light collected through the lens 110 to the image sensor 130. The reflection mirror 321 is inclined at 45 degrees with respect to the touch surface 10 such that light passed through the lens 110 enters the image sensor 130.

Figure 7:
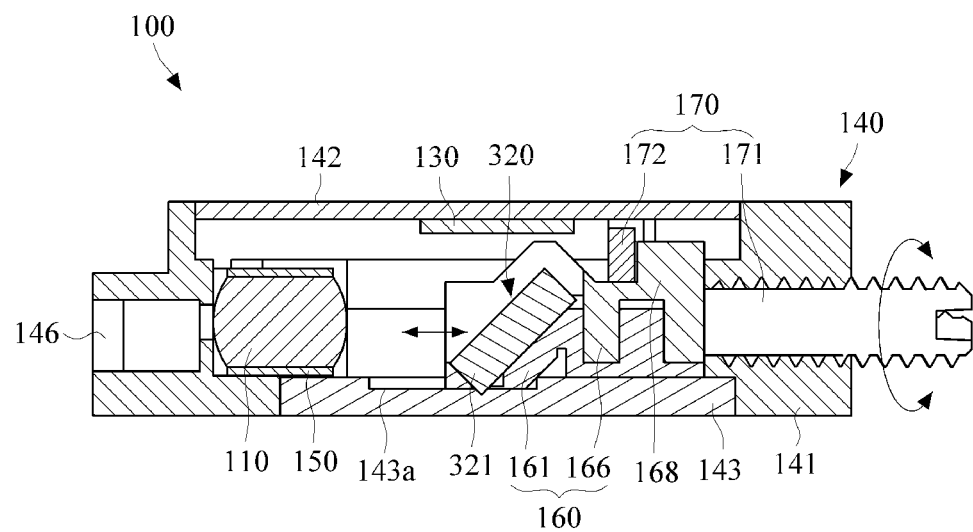
FIG. 7 is a cross-sectional view of the camera module shown in FIG. 1 for explaining an example where the optical path converting unit of FIG. 6 moves to adjust a focus.
Figure 8:
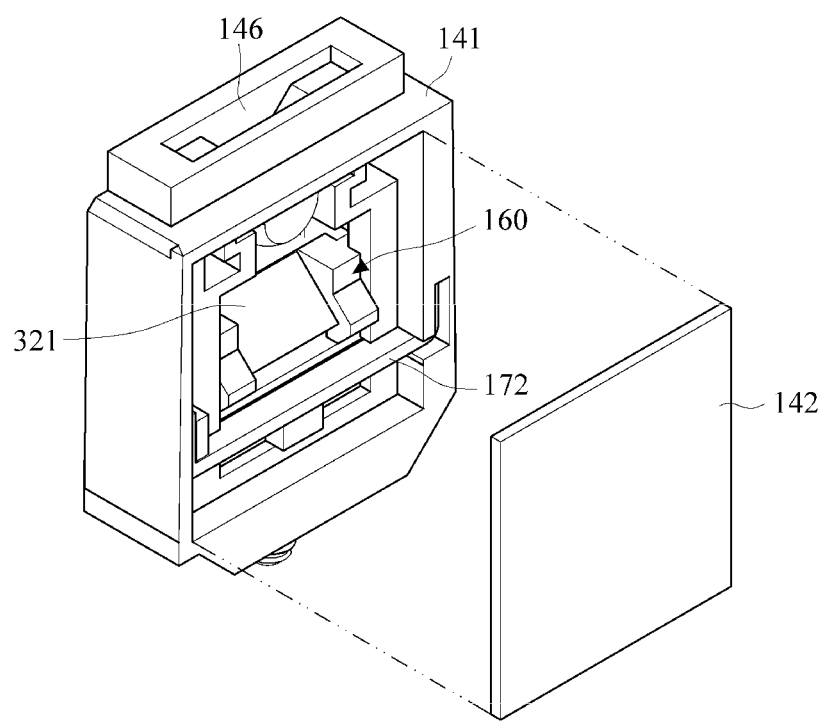
FIG. 8 is a partially exploded perspective view of the camera module of FIG. 7, which shows a part of the inside structure of the camera module.
Figure 9:
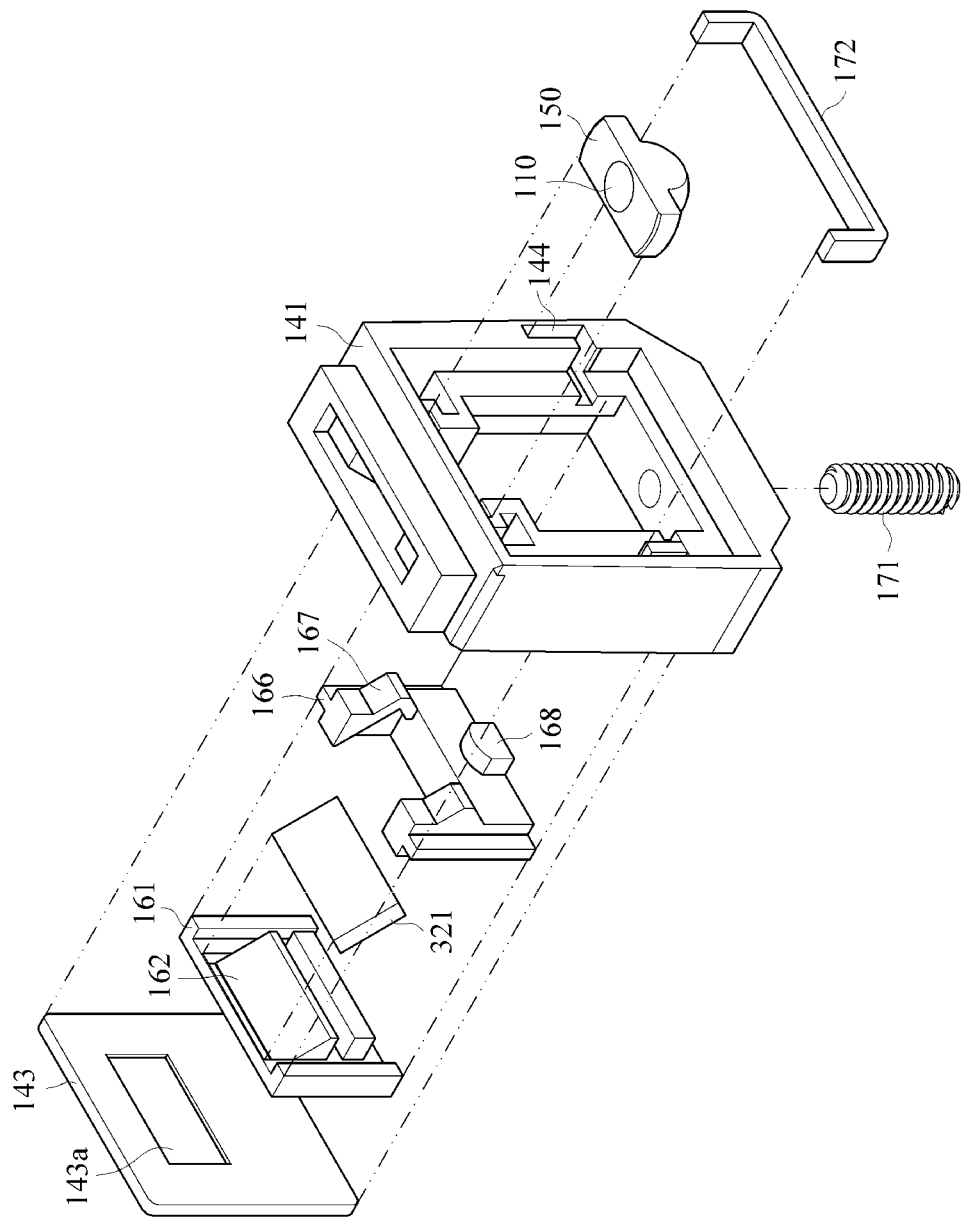
FIG. 9 is an exploded perspective view of the camera module shown in FIG. 8, which shows the remaining part of the inside structure of the camera module.

Meanwhile, the light needs to be accurately focused on the image sensor 130. For accurate focusing, the optical path converting unit (that is, 120, 220, and 320) may be configured to be movable in the direction of optical axis of the lens 110 to adjust a focus with respect to the image sensor 130. In this case, the camera module 100 may include, as shown in FIGS. 7, 8, and 9, a housing 140, a lens holder 150, a movable block 160, and an adjusting unit 170.

The housing 140 has an inside space, and a light-receiving hole 146 for receiving light is formed in one side of the housing 140. The housing 140 has a structure where first and second covers 142 and 143 are separately coupled with a housing main body 141 such that the lens holder 150, the movable block 160, etc. can be easily assembled in the housing 140. The image sensor 130 may be attached to the inner surface of the first cover 142. A guide groove 143a for guiding movement of the movable block 160 is formed in the inner surface of the second cover 143.

The lens holder 150 provides a space for the lens 110 and supports it. The lens holder 150 is installed in the housing 140 in correspondence to the light-receiving hole 146. In addition, the lens holder 150 has an opening toward the light-receiving hole 146 so as to transfer light received through the light-receiving hole 146 to the lens 110. Also, the lens holder 150 has another opening toward the optical path converting unit 320 so as to transfer light passed through the lens 110 to the optical path converting unit 320.

The movable block 160 supports the optical path converting unit 320. The example illustrated in the drawings shows that the movable block 160 supports the optical path converting unit 320 including the reflection mirror 321. However, the optical path converting unit 320 may be the optical path converting unit 120 illustrated in FIG. 1 the optical path converting unit 220 illustrated in FIG. 5. The movable block 160 is guided to move forward or backward in the direction of optical axis of the lens 110 in the housing 140. If the movable block 160 moves forward or backward in the direction of the optical axis of the lens 110, the reflection mirror 321 moves jointly forward or backward in the direction of the optical axis of the lens 110.

The movable block 160 may include a supporting member 161 and a fixing member 166. The supporting member 161 has an inclined supporting surface 162 such that the reflection mirror 321 is supported while being inclined at 45 degrees.

The fixing member 166 is coupled with the supporting member 161 to fix the reflection mirror 321. The fixing member 166 has fixing jars 167 for fixing both sides and the upper portion of the reflection mirror 321 by being coupled with the supporting member 161. Also, the fixing member 166 has a holding projection 168 for holding the center portion of a leaf spring 172 which will be described later.

The adjusting unit 170 allows focusing with respect to the image sensor 130 by moving the movable block 160. The reflection mirror 321 moves together with the movable block 160 when the movable block 160 moves forward or backward by the adjusting unit 170. At this time, the distance between the lens 110 and the reflection mirror 321 is controlled to thereby adjust a focus with respect to the image sensor 130.

The adjusting unit 170 may include an adjusting knob 171 and a spring member, for example, the leaf spring 172. The adjusting knob 171 is screw-coupled with the housing 140 such that one end of the adjusting knob 171 contacts the movable block 160 and the other end of the adjusting knob 171 is protruded out of the housing. The adjusting knob 171 screw-coupled with the housing 140 enables the movable block 160 to move forward or backward according to a rotation direction.

The leaf spring 172 applies an elastic force to the movable block 160 so that the movable block 160 is fixed in contact with the adjusting knob 171. Both end portions of the leaf spring 172 may be bent in the same direction, for example, the leaf spring 172 is formed in a "=" shape. In this case, the leaf spring 172 is positioned in such a manner to be caught by the holding projection 168 of the movable block 160, while the center portion of the leaf spring 172 intersects the moving direction of the movable block 160.

Both the end portions of the leaf spring 172 are put into fixing grooves 144 of the housing 140, respectively, and fixed therein. When the movable block 160 moves toward the lens 110, the leaf spring 172 is deformed by the holding projection 168 of the movable block 160 to produce an elastic restoring force. The elastic restoring force produced by the leaf spring 172 is applied to the movable block 160, so that the movable block 160 can be fixed in contact with the adjusting knob 171.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A camera module for an optical touch screen, which senses a position of an object touching a touch surface of the optical touch screen, the camera module comprising:
   a housing in which one side a light-receiving hole is formed;

at least one lens receiving light through the light-receiving hole and being configured such that an angle of view for a direction vertical to the touch surface is smaller than an angle of view for a direction horizontal to the touch surface;

an optical path converting unit comprising a prism section configured to reflect light collected through the lens in the direction vertical to the touch surface; and an image sensor being arranged behind the lens transversely on a surface of the housing and perpendicular to a horizontal plane containing the light-receiving hole so as to be disposed in a direction horizontal to the touch surface, and configured to receive the light reflected by the optical path converting unit, wherein the optical path converting unit further comprises a lens section integrated with the prism section and configured to focus the light collected through the lens on the image sensor; and wherein the optical path converting unit is movable in a direction of an optical axis of the lens to adjust a focus with respect to the image sensor, the prism section comprises a total reflection surface configured to reflect the light focused through the lens section to the image sensor, and the lens section has an incident surface that is at least as wide as an exit surface thereof so as to receive all light passed through the lens.

2. The camera module of claim 1, wherein the lens has a shape in which peripheral portions of a circular lens are cut off in the direction horizontal to the touch surface such that a height of the lens in the direction vertical to the touch surface is smaller than an aperture of the lens in the direction horizontal to the touch surface.

3. The camera module of claim 1, wherein the image sensor is attached on a surface of the prism section, to which the light reflected by the prism section is emitted.

4. The camera module of claim 1, further comprising:

a lens holder configured to support the lens and installed in the housing in correspondence to the light-receiving hole;

a movable block configured to support the optical path converting unit, and to be guided to be movable in the direction of the optical axis of the lens in the housing; and an adjusting unit configured to adjust a focus with respect to the image sensor by moving the movable block.

5. The camera module of claim 4, wherein the adjusting unit comprises:

an adjusting knob configured to be screw-coupled with the housing such that one end portion of the adjusting knob contacts the movable block, and to move the movable block forward or backward according to a rotation direction; and a spring member configured to apply an elastic force to the movable block such that the movable block is fixed in contact with the adjusting knob.

* * * * *